INVENTOR
FRED SCHLOSS
ATTORNEY

INVENTOR
FRED SCHLOSS

ATTORNEY

United States Patent Office 3,191,431
Patented June 29, 1965

3,191,431
PHASE MEASURING DEVICE
Fred Schloss, Bethesda, Md., assignor to the United States of America as represented by the Secretary of the Navy
Filed Aug. 28, 1961, Ser. No. 134,480
1 Claim. (Cl. 73—67.1)
(Granted under Title 35, U.S. Code (1952), sec. 266)

The invention described herein may be manufactured and used by or for the Government of the United States of America for governmental purposes without the payment of any royalties thereon or therefor.

The present invention relates to making phase measurements, and more particularly to means for accurately measuring the phase between two electrical wave signals having common frequencies components without any interaction between the signal channels.

The phase relationship between wave signals of the same periodicity may be measured by a number of prior art devices which generally operate satisfactorily. However, difficulty is encountered when the signal to noise ratio is low and it is desired to make accurate measurements. Furthermore, the prior art devices measure the phase relationship of complete complex signals and not the phase relationship of particular components of complex waves.

An object of the present invention is to provide means for measuring, with a high degree of accuracy, the phase relationship between two signals which have low signal to noise ratio.

Another object of the present invention is to provide means for measuring the phase relationship of specific frequency components of a pair of signals which contain diverse frequencies.

A further object is to provide means for generating an output signal of the same frequency as the frequency of the component of the signal which is being phase measured.

Yet another object of the present invention is to provide a phase meter which is not affected by any temperature drift of its operating components.

In accordance with the preferred form of the invention, a plurality of signals, which may have a simple or complex harmonic wave form, are generated by a plurality of suitable signal generating means. The signals which are to have their phase relation measured are fed from the generating means to attenuators for attenuating the signals. Each signal is fed to a separate attenuator; and the output of each attenuator is fed to a respective amplifier. Part of the output of one of the amplifiers, for identification called a first amplifier, is fed back to the input of the other amplifier, identified as the second amplifier. This feedback signal is so combined with the original signal fed to the second amplifier as to obtain a minimum combined output signal. The voltage of this minimum combined output signal from the second amplifier is measured by a voltmeter. The output of the first amplifier is then disconnected from the input of the second amplifier so that there is no feedback to the second amplifier, and the voltage of the remaining signal from the second amplifier is measured. The phase relationship of the two signals can be expressed by a trigonometric function; the sin $\phi$ of the phase angle is equal to the ratio of the voltage measurement of the minimum combined signal with feedback over that of the signal of the same amplifier without any feedback.

The phase angle between the voltages in the two channels is in the arc sin of this minimum voltage reading with feedback reading over the voltage without any feedback. The formula is $$\phi = \sin^{-1} + \frac{\text{voltage minimum}}{\text{voltage without feedback}}$$

Similarly, if one of the voltages is phase shifted 90° then $$\phi = \cos^{-1} \frac{-\text{voltage minimum}}{+\text{voltage w/o feedback}}$$

This follows because $\sin \phi = -\cos(\phi + 90)$.

Other objects and many of the attendant advantages of this invention will be readily appreciated as the same become better understood by reference to the following detailed description when considered in connection with the accompanying drawings wherein.

Figure 1:
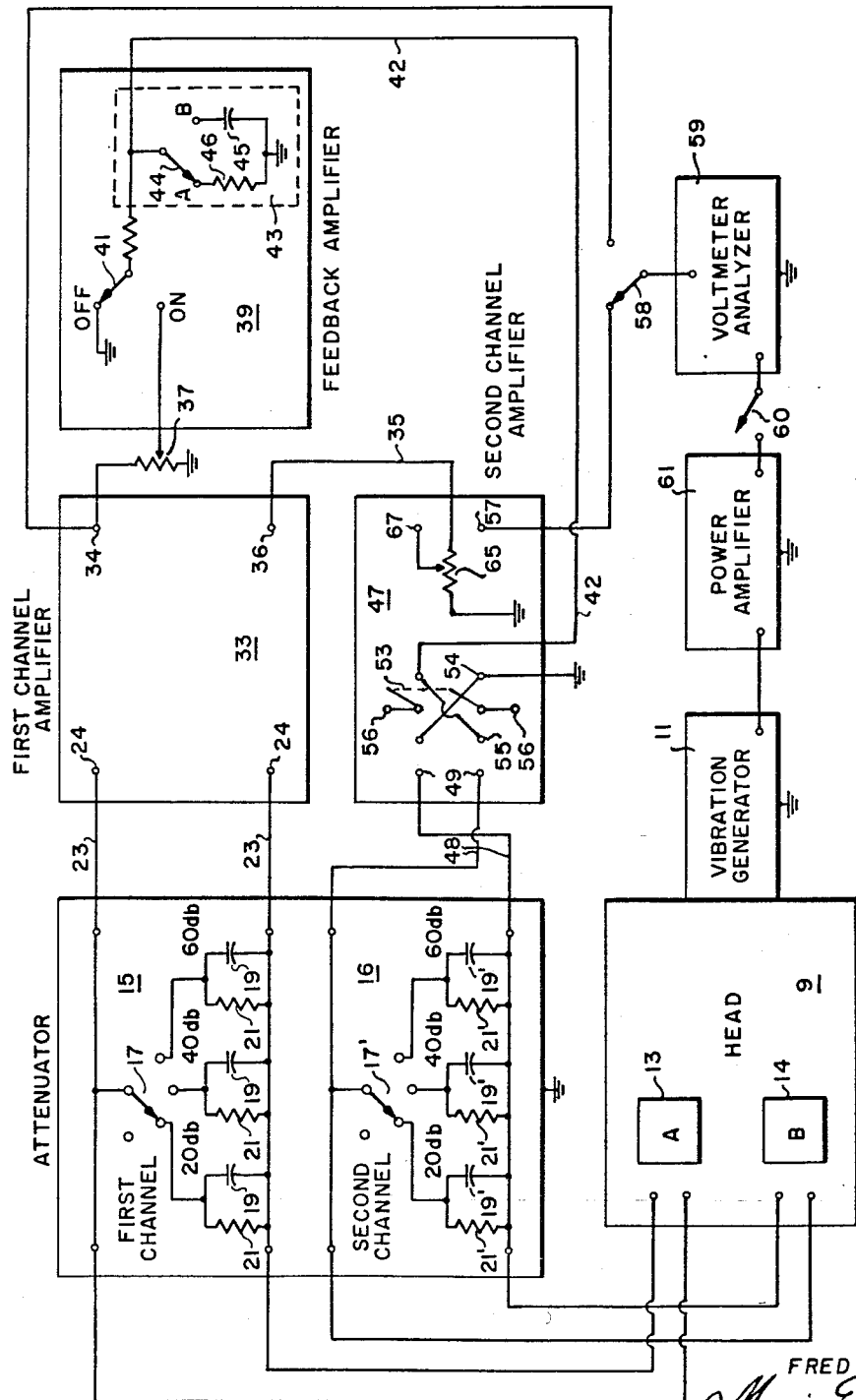
FIG. 1 is a block diagram of a phase meter in accordance with the invention.

Referring to FIG. 1, a signal source 9 generates a pair of attenuating current or periodic signals in response to a certain physical excitation from a mechanical vibration generator 11. In the preferred embodiment, the signals are derived from a mechanical impedance meter which includes an acceleration-responsive gage 13 for generating a first signal, and a force-responsive gage 14 for generating a similar second sinal which may be displaced in phase from the first signal. An impedance meter that produces such signals is shown, for example, in application Serial No. 842,214, now U.S. Patent No. 3,026,212, filed October 13, 1959, and in U.S. Patent No. 2,873,604 dated February 17, 1959.

The signal output of gage 13 is fed as an input signal to a first channel line connected to the input of a first channel attenuator 15; and the signal output of gage 14 is fed as an input signal to a second channel line connected to the input of a second channel attenuator 16. The invention is obviously not limited to gage-generated signals, by any suitable signals from other suitable sources can be fed to the inputs of the attenuators.

Each attenuator is provided with a plurality of attenuating circuit-branches selectively connectible to the associated channel line for adjusting the amount of attenuation of the associated signal. Thus, attenuator 15 comprises a selecting means in the form of a multi-positive switch 17 connected to one side of the channel line and selectively connectible to three attenuating circuit-branches, each comprising a capacitor 19 and a resistor 21 connected in parallel and connecting to the other side of the channel line. The values of the resistor-capacitor combinations are so chosen as to provide attenuation of 20 db, 40 db, and 60 db, depending on the position of switch 17. By disconnecting switch 17 from the three branches, zero attenuation is obtained.

Similarly, the second claimed attenuator 16 comprises an attenuation-selecting means in the form of a multiposition switch 17' selectively connectible to three attenuation, circuit-branches for 20 db, 40 db, and 60 db signal attenuation, each branch comprising a capacitor 19' and a resistor 21' connected in parallel. Obviously, other attenuation controlling or adjusting means may be utilized, and while a specific form using three separate circuit-branches are shown, the number of such branches and their arrangements are subjected to considerable variation.

The output of attenuator 15 is fed, through line 23, to the input terminals 24 of a first channel amplifier 33, details of which are described subsequently. The first channel amplifier 33 has a pair of outputs 34 and 36. A first output 36 is connected by way of conductor 35 to the second channel amplifier, as subsequently described.

A controlled portion of the output signal of amplifier 33 is fed through the second output of the amplifier 33 to a feedback amplifier; and to this end a gain-control potentiometer 37 receives the output signal and the desired amount of the signal passes from the potentiometer 37 to a feedback amplifier 39. The feedback amplifier 39 is described in more detail in connection with FIG. 4, but at this time it is pointed out it has a switch 41 through which its feedback signal may be fed to an output line 42 when the switch is in the "on" position. With the switch in the "off" position, no feedback signal reaches line 42.

The feedback amplifier 39 also has a phase-shifting network 43 for shifting the phase of the output signal of the feedback amplifier that is put on the line 42. The phase shifter network comprises a switch 44 selectively movable to a position B for connecting a capacitor bank 45 for a ninety degree phase, and to a position A for connecting a resistor 46 for a zero degree phase shift.

Referring now to the second channel signal, the output of the second channel attenuator 16 is fed to a second channel amplifier 47, more specifically via line 48 to the input terminals 49 of the amplifier 47. The second channel amplifier 47 is described in greater detail in connection with FIG. 3; but for the block diagram of FIG. 1, it is desired to note that in addition to the signal from attenuator 16, the second channel amplifier 47 receives a feedback signal from the feedback amplifier 39, via line 42. This feedback signal of line 42 reaches a double-pole, double-throw switch 53 of the second channel amplifier 47. The switch is shown schematically in FIG. 1 and has contacts 54 in one position and 55 in its second position. As will be apparent subsequently, the switch 53 in engagement with contacts 54 causes the feedback signal to be a positive signal in the amplifier 47; and in engagement with contacts 55 causes the signal to be negative.

Whatever signals pass through the amplifier 47, their altered output may be taken from output terminal 57 and fed through switch 58 to a voltmeter analyzer 59.

The voltmeter analyzer 59 may be of any well-known type such as is available commercially, and the invention is not limited to the use of any particular type. A voltmeter analyzer that is known to be suitable for this use is the Model 302A Wave Analyzer manufactured commercially by Hewlett Packard Company, 275 Page Mill Road, Palo Alto, California, and described in their bulletin 302A, copyrighted in 1959. This voltmeter analyzer is extremely selective so that components of the signal can be compared.

The voltmeter analyzer 59 will only measure the frequency which it is selectively tuned to. Therefore, all the noise which is outside of the tuned frequency band will be rejected. This assures a good signal to noise discrimination.

For the particular application of the invention described, the voltmeter analyzer 59 contains an internal oscillator producing a signal of the same frequency as is being measured. The output of the internal oscillator of the voltmeter analyzer 59 may be fed through switch 60 to a power amplifier 61 and thence to the vibrating generator 11 of the mechanical impedance meter for driving the force gage 14 and the acceleration gage 13 of the meter.

Returning to the amplifier 47, it is provided with a center tapped resistor 65 which has its tap connected to a terminal 67 of the amplifier. An end of the resistor 65 is connected via line 35 to the first feedback output 36 of the first channel amplifier 33. The function of the tapped resistor 65 is to provide an adjusted feedback signal to the second channel amplifier from the first channel amplifier in order to cancel out a static condition in the gages.

For an understanding of the operation of the system shown in FIG. 1, assume that the internal oscillator of the voltmeter 59 is set at a frequency of 500 cycles per second by way of an example. However, any other frequency may be used within the frequency band of the system which is in the order of 20 to 50,000 cycles per second. The voltmeter 59 can be set sharply to any particular frequency which may be the fundamental frequency of the signals or any single harmonic component of the signals. Thus, the fundamental frequency or any component thereof may be explored. Further, assume that the switch 60 is closed and the oscillator feeds the power amplifier 61 for driving the vibration generator 11. The vibration generator sets up such unusual vibrations that generate the signals to be compared.

The signal generated in the acceleration gage 13 is fed into the first channel attenuator 15. Further assume that the attenuator switch 17 is set to attenuate the signal by 20 db. The output of the attenuator is fed to the first channel amplifier 33 which amplifies the signal. A portion of the output of amplifier 33 is fed to the feedback amplifier 39, but its switch 41 is initially in "off" position.

The second output of the amplifier 33 is fed via line 35 to the center tapped resistor 65. This center tapped resistor is used to feed a signal from the first channel amplifier into the second channel amplifier in order to cancel out the aforesaid static condition. This is done by temporarily opening the switch 60 or cutting off the internal oscillator or voltmeter 59 so as to deenergize the vibration generator 11 so that no vibrations are placed against the gages 13 and 14; and they remain relatively still and do not produce operating signals. Any signals passing through the attenuators is the result of static conditions, and that passing through the amplifier 47 is fed to the sensing input of the voltmeter analyzer 59. The variable resistor 65 is then adjusted so that there is a zero reading on the voltmeter analyzer 59. When this is done the static voltage generated by the gages are not reflected in the voltmeter readings. The equipment is now operationally ready, and power is restored to the vibrating generator 11.

The signal generated in the force gage 14 is fed to the second channel attenuator 16 which is also set to attenuate the signal by 20 db. The attenuated signal is fed to the input terminals 49 of the second channel amplifier 47 which amplifies the signal. The amplified signal is taken from terminal 57 of the second channel amplifier and fed to the voltmeter analyzer 59 where the voltage is read without any feedback being present from the feedback amplifier. This is done with the switch 41 in 'off' position. Switch 41 in the feedback amplifier 39 is switched from the "off" to the "on" position, thereby connecting the feedback from the first channel amplifier to the second channel amplifier input via switch 53. Variable potentiometer 37 controls the amount of feedback and is adjusted so as to have the voltmeter analyzer 59 read a minimum value.

The phase angle $\phi$ is related to the ratio of minimum reading of voltmeter 59 over the reading of voltmeter 59 without any feedback. The relationship of the angle $\phi$ to switch position is shown in the table below.

| Switch position 44 | Switch position 53 | Angle $\phi$ (in degrees) |
|---|---|---|
| A | 54 | 0-90 |
| B | 54 | 0-90 |
| A | 55 | 90-180 |
| B | 54 | 90-180 |
| A | 55 | 180-270 |
| B | 55 | 180-270 |
| A | 54 | 270-360 |
| B | 55 | 270-360 |

When the minimum value is read on the voltmeter analyzer 59, then the angle $\phi$ lies in the quadrants as shown above, depending upon the positions of the switches 44 and 53.

To obtain the best accuracy the following table should be used:

| Switch position 44 | Angle $\phi$, degrees | $\phi$ |
|---|---|---|
| A | 0-45, 135-225, 315-360 | $\phi = \sin^{-1} \frac{+\text{voltmeter reading min}}{-\text{Voltmeter reading without feedback}}$ |
| B | 45-135, 225-315 | $\phi = \cos^{-1} \frac{-\text{voltmeter reading min.}}{+\text{voltmeter reading without feedback}}$ |

Figure 2:
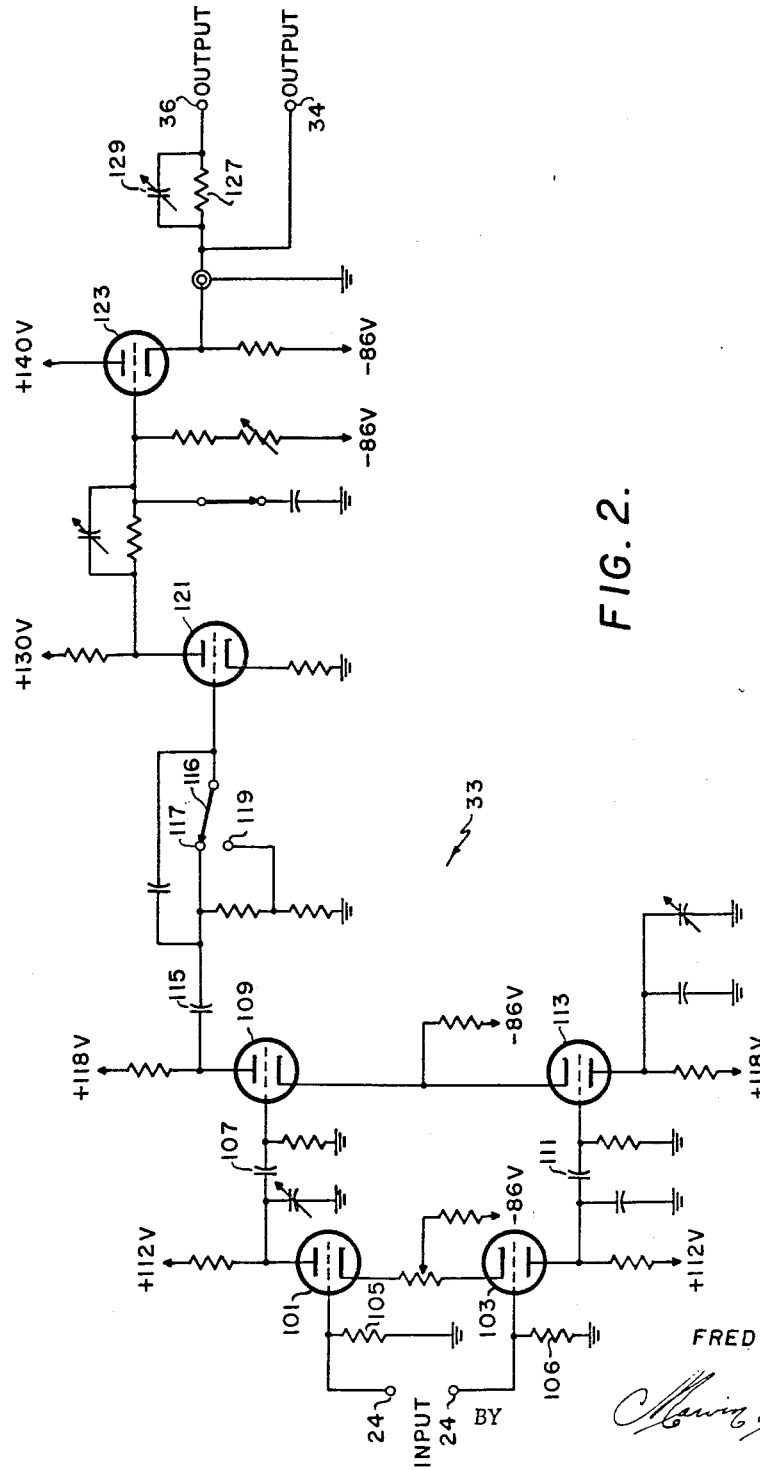
FIG. 2 is a circuit diagram of a suitable first channel amplifier which may be used in the preferred form of the invention.

FIG. 2 illustrates a specific circuit for the first channel amplifier 33. FIG. 2 is a Textronix type 122 amplifier which is utilized in a practical form of the invention. The amplifier comprises tubes 101 and 103 connected with their cathodes tied together in series. The input to the amplifier 33 is connected across terminals 24 which feed the grids of tubes 101 and 103, respectively. The grids of the tubes are connected to ground via resistor 105 and resistor 106, respectively. The plate of tube 101 is coupled through capacitor 107 to the grid of tube 109. The plate of tube 103 is coupled to the grid of tube 113 by way of capacitor 111; and the cathode of tubes 109 and 113 are connected together in series. The plate of tube 109 is coupled through capacitor 115, to the grid of tube 121 by way of a trimming switch 116 which in position 117 provides an amplifier gain of a thousand, or in position 119 provides an amplifier gain of a hundred. The plate of tube 121 is connected to one output terminal 34 (upper terminal of FIG. 1) through a cathode follower tube 123 which isolates the amplifier from the load circuits, and is connected to the other terminal 36 through a resistor 127 and a variable capacitor 129 in parallel.

Tubes 101 and 103 operate as a push-pull common cathode amplifier so that only the difference in voltages between terminals 24 is amplified. The amplified signal is fed to tube 109 and 113 from the plate of tube 101 and 103 respectively. The amplified output of the difference amplifier is fed by way of capacitor 115 to amplifier tube 121 and thence to the cathode follower tube 123 and output terminals 34 and 36.

Figure 3:
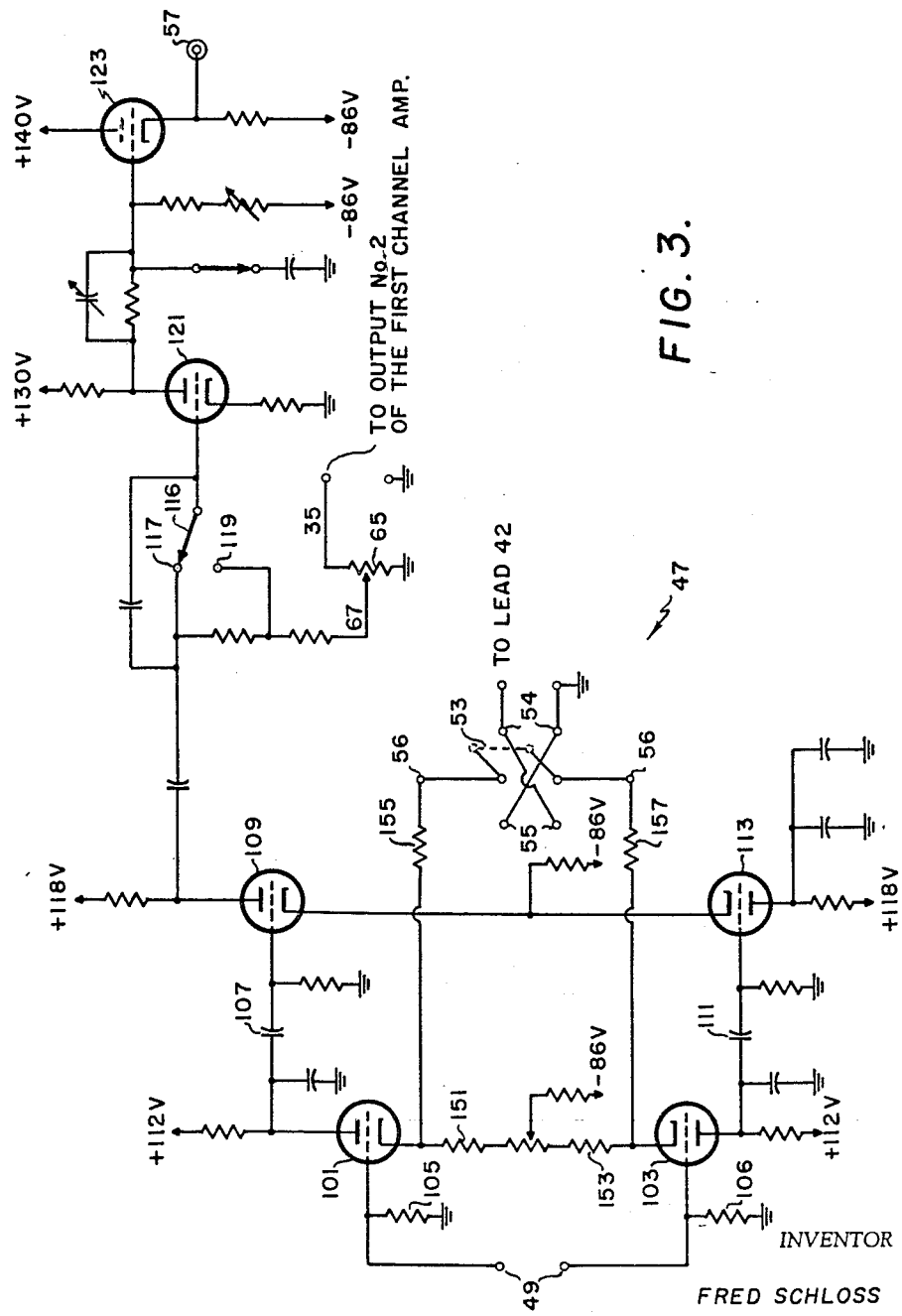
FIG. 3 is a circuit diagram of a suitable second channel amplifier which may be used in the preferred form of the invention.

The second channel amplifier 47 has tubes and certain other parts similar to that of amplifier 33; and in FIG. 3 which illustrates amplifier 47, these parts which operate have the same numbers similarly to those of FIG. 2. Note, however, that resistors 151 and 153 have been added in series between the cathodes of tubes 101 and 103. A resistor 155 is connected between one central terminal of switch 53 and the cathode of tube 101. A second resistor 157 is connected between the other central terminal of switch 53 and the cathode of tube 103. Switch 53 is of the double-pole double-throw variety with one terminal connected to the output line 42 from the feedback amplifier 39. Variable resistor 65 is a bias control resistor which has its end connected to one of the outputs 34 of the first channel amplifier 33.

The operation of FIG. 3 is similar with the operation of FIG. 2 as far as the application is concerned. However, assuming that the signal in line 42 has a component in phase with the signal applied to terminal 49, then the in-phase components will cancel out in tubes 101 and 103 and the only signal remaining will be the difference between the signals applied to terminal 49 and the signal applied to terminal 54. When a minimum voltage is obtained all the in-phase components of the signals have been cancelled out. If the difference signal increases instead of decreases then switch 53 should be thrown from terminal 54 to terminal 55 which changes the phase of the signal by 180°.

Figure 4:
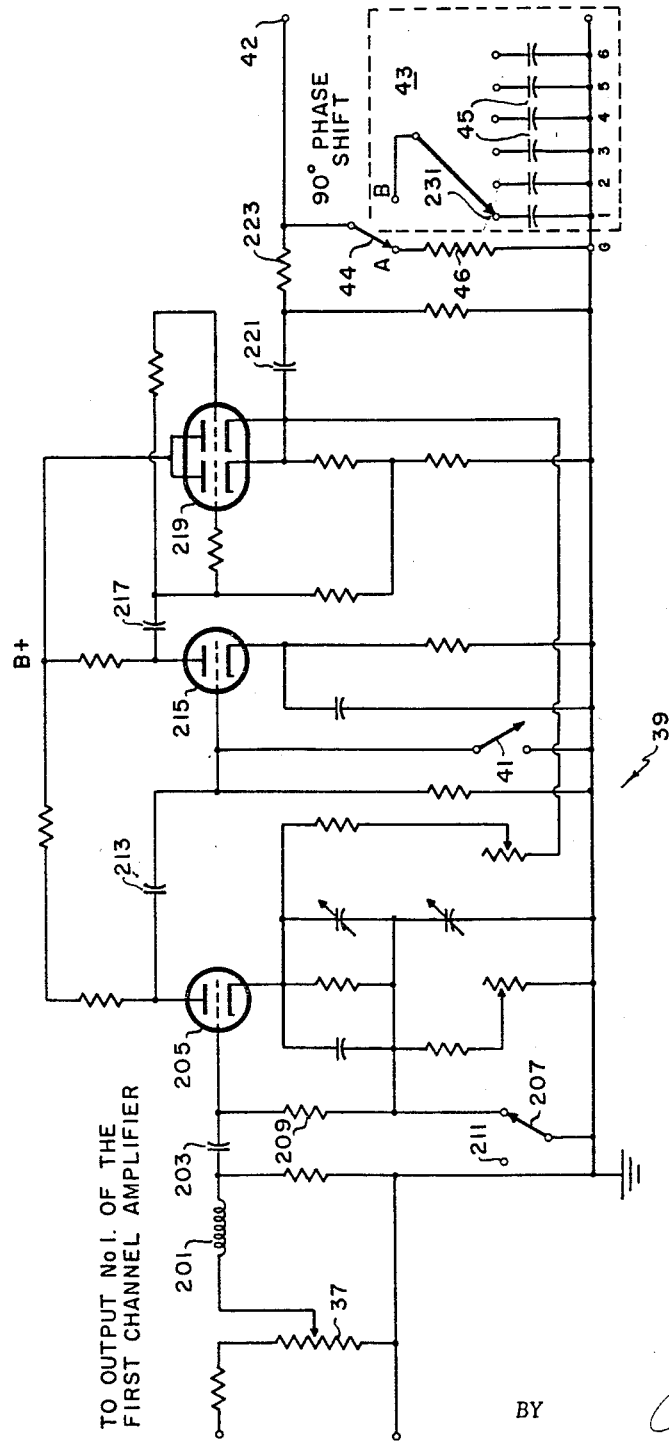
FIG. 4 is a circuit diagram of a suitable feedback amplifier which may be used in the preferred form of the invention.

A typical feedback amplifier utilizable for this invention is the Scott type 140A along the lines shown in FIG. 4. One end of inductor 201 is connected to the center tap of variable resistor 37 and the other end is connected to capacitor 203. The capacitor is connected to the grid of an amplifier tube 205. Switch 207 controls the gain of amplifier 205. When the switch 207 is connected to the resistor 209 the gain would be 100 times and with the switch connected to the terminal 211 the gain would be 10 times. A capacitor 213 connects the plate of tube 205 to the grid of tube 215. Switch 41 shorts the grid of tube 215 to ground when it is closed and in that manner can be used to cut off the feedback amplifier. This is the equivalent of switch 41 in "off" position in FIG. 1. The plate of tube 215 is connected to the grids of double triode tube 219 by a capacitor 217. The output of amplifier is taken from the cathodes of the double triode tube 219 through a capacitor 221 and a resistor 223 connected in series and to the output line 42. The resistor 46 is provided for the zero phase shift and a capacitor bank 43 are provided for a ninety degree phase shift. The switch 44 selects a zero phase shift in position A and a ninety degree phase shift in position B. A second switch 231 is provided to select the proper one of the capacitors 45 of the bank so as to have a ninety degree phase shift when the frequency of the signal to be phase shifted varies. Obviously, a variable capacitor or a series of variable capacitors may be used in the bank of capacitors.

The operation of FIG. 4 is as follows: A signal is fed through inductor 201 which is a low pass filter and passes signals under a megacycle. The signal is then fed to tube 205 and tube 215 which comprise a two stage amplifier. When switch 41 is in the closed position the signal to be amplified is shorted to ground and no feedback can occur. With the switch in the open position as shown in the drawing, the signal will feed to the double triode cathode follower tube 219. When switch 44 is in the A position the output signal is not phase shifted. When the switch 44 is placed in the B position the output is phase shifted ninety degrees by a capacitor of a capacitor bank 43. The frequency of operation and accuracy desired dictates which capacitor should be used. In the preferred embodiment, the capacitors indicated by subscripts 1, 2, 3, 4, 5 and 6 in FIG. 4 had capacitors of 100, 20, 10, 5, 1, and .5 microfarads, respectively.

Obviously many modifications and variations of the present invention are possible in the light of the above teachings. It is, therefore, to be understood that within the scope of the appended claim the invention may be practiced otherwise than as specifically described.

What is claimed is:

Apparatus for determining the phase angle between the force applied to a vibratory system and the resulting vibration of said system comprising:

vibration generator means, coupled to said vibratory system, for generating vibrations in said vibratory system of a predetermined frequency;

first transducer means for generating a first electrical signal proportional to the acceleration of said vibratory system;

second transducer means for generating a second electrical signal proportional to said force applied to said vibratory system by said vibration generator means;

control means, electrically connected to said first transducer means, for adjusting the amplitude of said first electrical signal to equal the amplitude of the in-phase components of said second signal;

phase-shifting means, electrically coupled to said control means, for shifting the phase of said second electrical signal by discrete multiples of ninety degrees;

subtracting means, electrically coupled to said phase shifting means and said second transducer means, for subtracting one of said electrical signals from the other electrical signal, whereby the in-phase components of said first and second signals are cancelled;

filter means, electrically connected to said subtracting means and to said vibration generator means, for passing the out-of-phase components of said first and second signals that are of said predetermined frequency; and voltage measuring means, coupled to said filter means and to said control means, for measuring said first electrical signal and said out-of-phase components of said predetermined frequency.

References Cited by the Examiner

UNITED STATES PATENTS

| | | | |
|---|---|---|---|
| 2,305,268 | 12/42 | Minor et al. | 73—67.1 |
| 2,517,805 | 8/50 | Spindler | 324—89 X |
| 2,672,588 | 3/54 | Vanous | 324—89 |
| 2,857,568 | 10/58 | Hering et al. | 324—83 X |

OTHER REFERENCES

Direct Reading Phasemeter, article in The Review of Scientific Instruments, April 1950, pages 271–273.

A Simple Phase Measuring Circuit, article by R. A. Seymour, Post Office Electrical Engineers' Journal, vol. 43, part 4, pages 198–199, January 1951.

WALTER L. CARLSON, *Primary Examiner.*